United States Patent Office 3,367,582
Patented Feb. 6, 1968

3,367,582
COMMINUTING APPARATUS
Thomas Cropper Ryley Shepherd, Moraston House,
Bridstow, near Ross-on-Wye, England
Filed July 20, 1965, Ser. No. 473,378
Claims priority, application Great Britain, Apr. 26, 1965,
17,438/65
12 Claims. (Cl. 241—81)

ABSTRACT OF THE DISCLOSURE

A frusto-conical tubular filter has a driven, helical-spiral wiper located therein to move solid matter to a lower outlet from the filter, with liquid passing therethrough.

---

The invention concerns improvements relating to apparatus for comminuting solid matter in a liquid suspension, for example for comminuting solid matter in liquid sewage or for comminuting foreign bodies in a liquid. An example of the latter application is to comminuting sea shells and other solid matter in sea water fed to the condenser of a steam driven electric generating plant.

According to the invention such comminuting apparatus comprises an inlet duct for liquid containing solid matter, a filter member of tubular form having one open end in communication with the inlet duct to receive within the interior of the filter member the liquid containing solid matter from the inlet duct, an outlet duct surrounding the filter member to receive liquid passed through the filter member, the filter member retaining therein solid matter from passage to said outlet duct, a wiper means rotatably driven within the filter member to move such retained solid matter along the filter member to the other open end thereof, a rotary comminutor to receive solid matter discharged from said other end of the filter member together with liquid, and motor means to drive the filter member and the comminutor.

Preferably, a return feed means is included from the comminutor to said outlet duct whereby comminuted matter and liquid is discharged from the comminutor into such duct.

Advantageously the filter member is of frusto-conical tubular form presenting the larger diameter open end located at a joint between the inlet and outlet ducts, and the smaller diameter open end located adjacent an inlet throat of the comminutor. Preferably the wiper means is rotatably mounted co-axially within the frusto-conical filter member and comprises at least one wiper of helico-spiral form which engages the interior surface of the filter member to provide a rotary wiping action carrying the retained solid matter axially along the filter member towards said smaller diameter open end.

Embodiments of apparatus in accordance with the invention are hereinafter described by way of example with reference to the accompanying drawings wherein.

Figure 1:
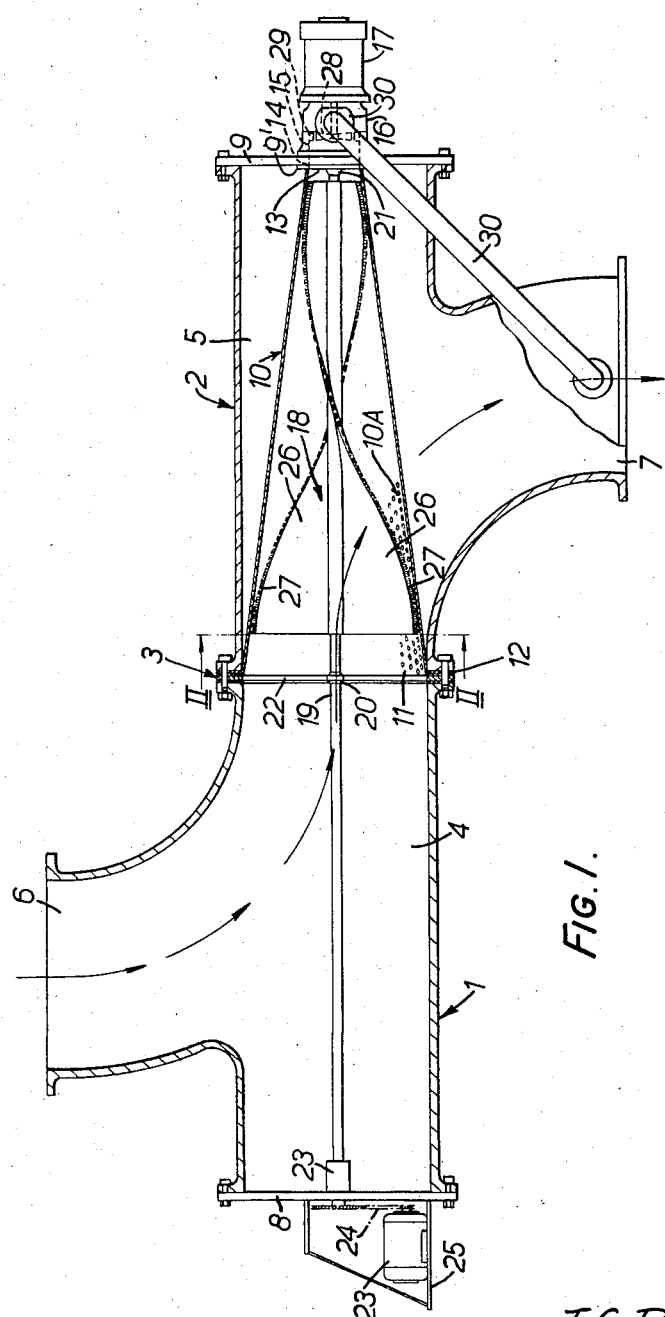
FIG. 1 is a side elevational view of one form of the apparatus.

The apparatus shown is especially though not exclusively for use in association with a steam turbine electric generating plant utilising sea water as the cooling liquid of a condenser. The apparatus comprises an inlet duct 1 for the sea water, and an outlet duct 2 from which the sea water is conveyed to the condenser. The ducts 1, 2 are conjoined at 3 with suitable sealing each to present a passage 4, 5 in co-axial extension one of the other with a lateral inlet 6 and outlet 7 respectively. Each duct has a closure plate member 8, 9 to the side of the respective inlet or outlet remote from the joint 3. A filter member 10 of frusto-conical tubular form presents at the larger diameter open end 11 a flange 12 or equivalent formation for location at the joint 3 between the ducts. The smaller diameter open end 13 of the filter member is supported by a spider 9' secured on the respective closure plate 9 around a hole 14 through the plate so as to be located adjacent and in communication with an inlet throat 15 of a rotary comminutor 16 driven by an electric motor 17, the comminutor and motor assembly being carried externally by the plate. The filter member walling 10A consists of perforated sheet material. The total area of the perforations, i.e., the liquid passing area, exceeds the bore of the inlet duct.

A wiper means 18 is rotatably mounted co-axially within the filter member by means of an axial shaft 19 carried in water lubricated bearings 20, 21 located respectively by a spider 22 secured at the duct joint 3 and by the spider 9' of the closure plate 9. The shaft 19 extends through the other closure plate 8 by way of a suitable gland and bearing assembly 23 to be driven by an electric motor 23' and reduction chain drive 24 carried in a housing 25 externally of such closure plate. The wiper means comprises any suitable number, two as shown, of individual wiper blades 26, each fixed on the shaft 19 and presenting a brush 27, suitably of stainless steel wire, of helico-spiral form which engages the interior surface of the filter member and is driven in the appropriate direction of rotation, indicated at A in FIG. 2, to provide a rotary wiping action carrying solid matter retained within the filter member axially along same towards the comminutor.

The comminutor comprises a rotary impeller 28 driven at high speed by its motor and carrying breakers to co-act with a ring of teeth 29 within which the impeller rotates in per se known manner. A return feed pipe 30 is connected from the comminutor discharge outlet 31 to the outlet duct 2 downstream of the filter member.

In use, the sea water is received within the filter member from the inlet duct, being delivered axially towards the smaller diameter end. The outlet duct surrounding the filter member receives the sea water passed therethrough, whilst the filter member retains the solid matter, e.g., sea shells and other foreign bodies, contained in the sea water, the filter perforations being of suitable mesh size. Rotation of the wiper means causes a rotary wiping or brushing action such as to carry the retained solid matter axially along the filter member to the smaller diameter end. The wiping action maintains the solid matter in motion so that it does not block the perforations, and free passage of sea water from the inlet to the outlet duct is assured. The solid matter becomes forced into the comminutor together with some sea water to be broken up into sufficiently fine form to be discharged in suspension in the water back via the return feed connection to the outlet duct to pass with the sea water to the condenser. Instead of such return feed, the comminuted solid matter and sea water discharged from the comminutor may pass to a separate outlet if desired.

While in existing installations the sea shells form a serious restriction to the satisfactory flow of water through the condenser and require that they be removed regularly from the condenser, or a normal mesh filter thereto, the present invention provides that the shells are reduced to a finely divided state such that they may pass through the condenser without restraint and form no restriction to the flow of water through the condenser.

The wiper means is continuously driven. While it may be arranged that the comminutor is also continuously driven it is preferred that it be started and stopped automatically on a predetermined time cycle.

Figure 2:
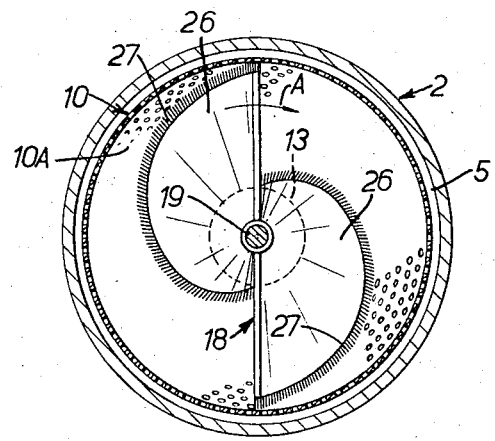
FIG. 2 is a sectional view on the line II—II of FIG. 1.

The arrangement of FIGS. 1 and 2 is satisfactory for dealing with sea shells since these do not tend to cling in and block the perforated filter member as would occur with fibrous materials. Blockage by fibrous materials would possibly be increased by the wiper means tending to press the material into the perforations.

Figure 3:
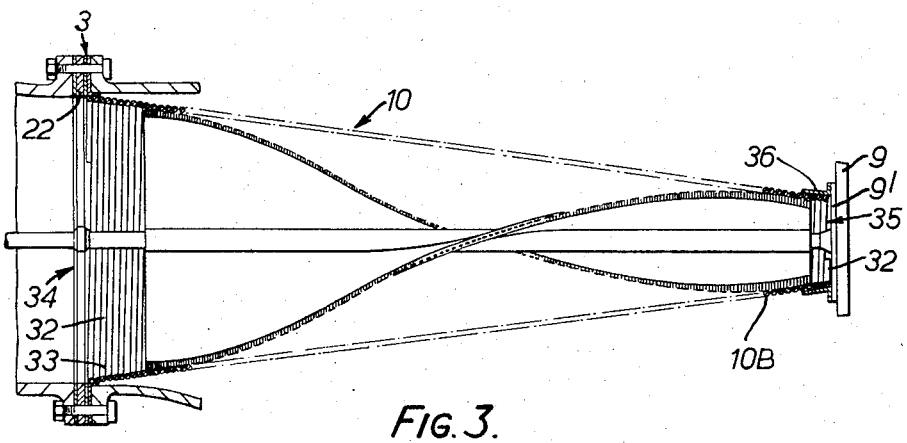
FIG. 3 illustrates a different form of the filter member.

FIG. 3 illustrates a modified arrangement for use in dealing with sewage or other liquid containing fibrous materials. The apparatus is substantially the same except for the different form of the filter member 10. Thus the walling 10A of the perforated sheet material is replaced by a walling 10B consisting of a round section wire or rod 32, e.g., of stainless steel coiled in helico-spiral formation to present a continuous interstitial slot 33 between the turns. The larger diameter end 34 of the coil is secured at the duct joint 3 as before. The smaller diameter 35 end of the coil leads freely into the comminutor inlet throat and is supported internally by the wiper means. Thus an inlet throat may be presented as at 36 by the closure plate spider 9' to receive the coil end 35.

Water carrying fibrous material enters the filter coil through the larger diameter end. The turns are suitably close pitched as to retain the fibrous material within the coil, whilst allowing passage of water through the slot. The material will de deposited on the coiled rod and become entangled therewith. The rotary wiper engages the fibrous material on the coiled rod and carries such material along the winding path of the rod towards the smaller diameter end of the coil. The material is carried off the rod at such end—it is for this reason that the coil slot at the smaller end is not blocked by supporting means—and into the comminutor.

I claim:

1. Comminuting apparatus comprising an inlet duct for liquid containing solid matter, a filter member of tubular form a pair of open ends, having one open end being in communication with the inlet duct to receive within the interior of the filter member the liquid containing solid matter from the inlet duct, an outlet duct surrounding the filter member to receive liquid passed through the filter member, the filter member retaining therein solid matter from passage to said outlet duct, a wiper means rotatably driven within the filter member to move such retained solid matter along the filter member to the other open end thereof, a rotary comminutor to receive solid matter discharged from said other end of the filter member together with liquid, and motor means to drive the wiper means and the comminutor.

2. Apparatus according to claim 1 including return feed means from the comminutor to said outlet duct whereby comminuted matter and liquid is discharged from the comminutor into such duct.

3. Apparatus according to claim 1 wherein the filter member is of frusto-conical tubular form presenting the larger diameter open end located at a joint between the inlet and outlet ducts, and the smaller diameter open end located adjacent an inlet throat of the comminutor.

4. Apparatus according to claim 3 wherein the wiper means is rotatably mounted co-axially within the frusto-conical filter member and comprises at least one wiper of helico-spiral form which engages the interior surface of the filter member to provide a rotary wiping action carrying the retained solid matter axially along the filter member towards said smaller diameter open end.

5. Apparatus according to claim 3 wherein walling of the filter member presenting the frusto-conical tubular form consists of perforated sheet material.

6. Apparatus according to claim 3 wherein walling of the filter member presenting the frusto-conical tubular form consists of a rod coiled in helico-spiral formation to present a continuous interstitial slot between the turns.

7. Apparatus according to claim 6 wherein at the smaller diameter open end of the filter member the coiled rod leads freely into an inlet throat of the comminutor and is supported internally by the wiper means.

8. Apparatus according to claim 1 wherein the total liquid passing area of the filter member exceeds the bore of the inlet duct.

9. Apparatus according to claim 1 wherein the inlet and outlet ducts are conjoined each to present a passage in co-axial extension one of the other with a lateral inlet and outlet respectively, and each duct has a closure member to the side of the inlet or outlet remote from the joint, the closure member of the outlet duct carrying the comminutor and an electric motor therefor with an inlet throat of the comminutor adjacent the respective open end of the filter member.

10. Apparatus according to claim 9 wherein the closure member of the inlet duct rotatably mounts a shaft extending axially through the inlet and outlet ducts to drive the wiper means, and carries an electric motor and drive means for said shaft.

11. Apparatus according to claim 1 wherein the wiper means comprises at least one metal brush presenting a helical form engaging the interior surface of the filter member.

12. Comminuting apparatus comprising an inlet duct for liquid containing solid matter, an outlet duct conjoined with said inlet duct each duct to present a passage in co-axial extension one of the other, said outlet duct having a lateral outlet and a closure member to the side of such outlet remote from the joint of the ducts, an electrically driven rotary comminutor carried by said closure member, a filter member of frusto-conical tubular form presenting a larger diameter open end located at the joint of the ducts in communication with said inlet duct to receive within the interior of the filter member the liquid containing solid matter from said inlet duct and a smaller diameter open end located adjacent an inlet throat of said comminutor, the filter member retaining therein solid matter from passage to said outlet duct whilst passing liquid thereto, a wiper means rotatably driven within the filter member to move such retained solid matter along the filter member and discharge same together with liquid into said comminutor, and return feed means from said comminutor to said outlet duct whereby comminuted matter and liquid is discharged from the comminutor into such duct.

References Cited

UNITED STATES PATENTS

| 2,298,830 | 10/1942 | McGillis | 241—81 X |
| 2,511,357 | 6/1950 | Marty | 146—76 |
| 2,822,846 | 2/1958 | Ward | 146—68 X |
| 3,003,708 | 10/1961 | Leonard | 241—81 |
| 3,113,733 | 12/1963 | Carlson | 241—68 |
| 3,266,542 | 8/1966 | Paoli | 146—76 |

WILLIAM W. DYER, JR., *Primary Examiner.*

W. D. BRAY, *Assistant Examiner,*